United States Patent
Gray et al.

(10) Patent No.: US 9,510,315 B2
(45) Date of Patent: Nov. 29, 2016

(54) WIRELESS CLIENT POSITION ESTIMATING SYSTEM AND METHOD

(71) Applicant: Aruba Networks, Inc., Sunnyvale, CA (US)

(72) Inventors: Gordon P. Gray, Menlo Park, CA (US); Anthony G. Burke, Frisco, TX (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/953,671

(22) Filed: Jul. 29, 2013

(65) Prior Publication Data
US 2014/0031062 A1    Jan. 30, 2014

Related U.S. Application Data

(63) Continuation of application No. 12/239,199, filed on Sep. 26, 2008, now Pat. No. 8,520,647.

(60) Provisional application No. 60/975,371, filed on Sep. 26, 2007.

(51) Int. Cl.
*H04W 24/00* (2009.01)
*H04W 64/00* (2009.01)
(Continued)

(52) U.S. Cl.
CPC .......... *H04W 64/003* (2013.01); *G01S 5/0205* (2013.01); *G01S 5/0257* (2013.01); *G01S 5/0263* (2013.01); *G01S 5/0278* (2013.01); *H04W 4/02* (2013.01); *H04W 4/021* (2013.01); *H04W 4/025* (2013.01); *H04W 4/028* (2013.01); *H04W 4/043* (2013.01); *H04W 4/22* (2013.01);
(Continued)

(58) Field of Classification Search
CPC . H04W 4/02; H04W 4/021; H04W 36/0094; H04W 4/028; H04W 4/043; H04W 4/22; H04W 64/003; H04W 4/025; H04W 76/028; G01S 5/0205; G01S 5/0278; G01S 5/0257; G01S 5/0263; G01S 5/06; G01S 1/70; G01S 5/0242
USPC .............................................. 455/456.1–457
See application file for complete search history.

(56) References Cited

U.S. PATENT DOCUMENTS

| | | | |
|---|---|---|---|
| 2002/0122003 A1* | 9/2002 | Patwari ................ | G01C 21/206 342/450 |
| 2005/0185618 A1* | 8/2005 | Friday et al. ................. | 370/331 |

(Continued)

OTHER PUBLICATIONS

U.S. Appl. No. 12/239,199, Non Final Office Action, mailed Dec. 13, 2010.
U.S. Appl. No. 12/239,199, Final Office Action, mailed Jun. 6, 2011.
U.S. Appl. No. 12/239,199, Notice of Allowance, mailed May 9, 2013.

*Primary Examiner* — Nathan Mitchell
*Assistant Examiner* — Sayed T Zewari
(74) *Attorney, Agent, or Firm* — Brooks, Cameron & Huebsch, PLLC (57) ABSTRACT

The present invention comprises a system and method for determining an estimated position of a wireless mobile client device operating in a communications environment covered by a wireless local area network. The received signal strength of the wireless mobile client device is measured by one or more access points serving devices in the communications environment. In a preferred embodiment, the error between the received signal strength measured by the access points and the expected received signal strength at a plurality of locations in the communications environment is calculated. The location of the device is determined from the error.

15 Claims, 6 Drawing Sheets

(51) Int. Cl.
*H04W 4/22* (2009.01)
*H04W 4/02* (2009.01)
*G01S 5/02* (2010.01)
*H04W 4/04* (2009.01)
*H04W 76/02* (2009.01)
*H04W 36/00* (2009.01)

(52) U.S. Cl.
CPC ......... *H04W36/0094* (2013.01); *H04W 64/00* (2013.01); *H04W 76/028* (2013.01)

(56) References Cited

U.S. PATENT DOCUMENTS

| | | | |
|---|---|---|---|
| 2005/0245233 A1* | 11/2005 | Anderson | H04L 63/08 455/411 |
| 2005/0267677 A1* | 12/2005 | Poykko et al. | 701/207 |
| 2007/0178911 A1* | 8/2007 | Baumeister et al. | 455/456.1 |
| 2008/0085692 A1* | 4/2008 | Hart | H04W 16/20 455/187.1 |
| 2008/0161011 A1* | 7/2008 | Babin et al. | 455/456.1 |
| 2009/0082034 A1 | 3/2009 | Gray et al. | |

\* cited by examiner

WIRELESS CLIENT POSITION ESTIMATING SYSTEM AND METHOD

CROSS-REFERENCE TO RELATED APPLICATIONS

This application is a continuation of U.S. patent application Ser. No. 12/239,199 filed Sep. 26, 2008, now U.S. Pat. No. 8,520,647, which claims the benefit of U.S. Provisional Patent Application No. 60/975,371 filed Sep. 26, 2007. The entire contents of both of which are incorporated by reference. The applicant hereby rescinds any disclaimer of claim scope in the parent application or the prosecution history thereof and advise the USPTO that the claims in this application may be broader than any claim in the parent application.

FIELD OF THE INVENTION

The present invention relates generally to the field of location tracking communications devices in communications environments. More particularly, the present invention relates to a system and methods for determining an estimated position of a mobile wireless client device based on the received signal strength of a communications signal transmitted by the device to one or more access points serving the wireless network.

BACKGROUND OF THE INVENTION

With the increase in mobile computing devices and wireless LANs, it has become important to determine the position of a device at any point in time. The increasing popularity of Institute of Electrical and Electronics Engineers (IEEE) standard 802.11 conforming hardware and networks make it a particularly attractive implementation platform for a wireless positioning system. Due to its widespread adoption, it is easy to obtain commercial off the shelf conforming hardware. Further, many mobile computing devices already have conforming equipment installed, eliminating the need to purchase and install additional hardware. Likewise, the prevalence of networks conforming to the IEEE 802.11 specification provides a pre-existing infrastructure for wireless positioning.

Unfortunately, commercial off the shelf IEEE 802.11 conforming hardware does not provide positioning functionality. Despite this, positioning can be implemented by using received signal strength measurements provided by an IEEE 802.11 conforming wireless card.

There are two common approaches to solve the problem of locating a wireless client device. The received signal strength indicator (RSSI) is a measure of the power received by the client from an access point (AP) and provides information as to the position of the client. Indeed, RSSI is position dependent as it is affected by factors such as distance from the access point and attenuation due to intervening walls.

In a first method, a database of RSSI measurements of one or more known access points (APs) is built and the database of RSSI information of the APs is used by a wireless mobile client to determine its own position. In the first method, a radio map, also known as a radio fingerprint, comprises a database of RSSI vector measurements associated with corresponding positions. The wireless mobile client device determines its own position using the RSSI vector measurement and various classification techniques. Radio map algorithms require a burdensome data collection phase where a large number of signal strength measurements must be recorded along with the corresponding position. If access points are moved, or the environment changes, the radio map is no longer valid and the data collection process must be repeated.

In a second method, signal propagation is modeled by taking into consideration obstructions in the signal propagation path, such as walls, furniture, and other objects in the environment. The signal propagation model is then used by the wireless mobile client to compute expected signal strength. Such an approach is rather unlikely to work in practice, except in some ideal or highly simplistic cases, primarily attributed to the complexity involved in accurately modeling signal propagation inside structures, like an office building.

Thus, both prior art methods require some field surveying to build the RSSI database and radio map or to calibrate the signal propagation model. A wireless client present at the actual position is used to take readings, which could be inaccurate due to the huge subset of various mobile wireless client device vendors with numerous differing technical specifications concerning generation of RSSI, and the resultant variation in RSSI readings generated by this plethora of devices.

Further, both methods require installation of software and data on the wireless mobile client so that it can determine its own position.

Therefore, there is a need for an improved method of determining the position of a mobile wireless client device without such constraints.

BRIEF SUMMARY OF THE INVENTION

The present invention comprises a system and method for determining an estimated position of a wireless mobile client device operating in a communications environment covered by a wireless local area network. The received signal strength of a signal transmitted by the wireless mobile client device is measured by one or more access points serving devices in the communications environment. In a preferred embodiment, the error between the received signal strength measured by the access points and the expected received signal strength at a plurality of locations in the communications environment is calculated. The estimated position of the device is determined from the error.

In a preferred embodiment, the present invention is directed to a method for determining an estimated position of mobile wireless client device in a communications environment served by a wireless communications network, the method comprising: identifying a plurality of locations in the communications environment; employing one or more access points to serve the communications environment, wherein each access point is positioned at a location in the plurality of locations; building a model of the communications environment comprising attenuation factors that approximate an attenuation effect on propagation of communications signals in the communications environment between the location of the one or more access points and a second location in the plurality of locations; measuring a received signal strength at the one or more access points of a signal transmitted from a first mobile wireless client device; and determining the estimated position of the first mobile wireless client device based on the received signal strength, an identification of transmitted signal strength and the model.

In another preferred embodiment, the determining step further comprises calculating an error between an expected received signal strength and the received signal strength at each location and selecting potential locations based on the error.

In another preferred embodiment, the estimated position of the mobile wireless client device is a selected potential location having a least error.

In another preferred embodiment, the invention further comprises considering the error of locations adjacent to the potential locations to determine the estimated position of the mobile wireless client device.

In another preferred embodiment, the estimated position of the mobile wireless client device is a selected potential location having adjacent locations comprising a least statistical error.

In another preferred embodiment, the invention further comprises identifying a manufacturer of the first mobile wireless client device and determining an assigned attenuation factor from the identification.

In another preferred embodiment, the invention further comprises: measuring the transmitted signal strength of the first mobile wireless client device under known conditions to assigning an attenuation factor based on the measurement.

In another preferred embodiment, the manufacturer is identified from a media access control layer address of the first mobile wireless client device.

In another preferred embodiment, the building step further comprises determining the attenuation factors based on an attenuation effect of structural features in the communications environment between a first location of the one or more access points and the second location in the plurality of locations.

In another preferred embodiment, the invention further comprises mapping the plurality of locations on a floor plan.

In another preferred embodiment, the invention further comprises identifying a known position of the first mobile wireless client device on the floor plan and updating the model based on the received signal strength from the first mobile wireless client device.

In another embodiment, the present invention is directed to a system for determining an estimated position of a wireless client device, comprising: a processor coupled to a memory; and program code stored on a media, that, when executed by the processor, generates an executable program in the memory that, when executed by the processor, causes the processor to perform steps comprising: identifying a plurality of locations in a communications environment; designating a location in the plurality of locations for an access point serving the communications environment; building a model of the communications environment comprising attenuation factors that approximate an attenuation effect on propagation of communications signals in the communications environment between a first location of the access point and a second location in the plurality of locations; measuring received signal strength at the access point of a signal transmitted from a first mobile wireless client device; and determining the estimated position of the first mobile wireless client device based on a received signal strength, an identification of transmitted signal strength and the model.

In another preferred embodiment of the invention, the executable program further causes the processor to perform a step comprising: selecting a predicted location having adjacent locations comprising least statistical error.

In another preferred embodiment of the invention, the executable program further causes the processor to perform steps comprising: identifying a manufacturer of the first mobile wireless client device and determining an assigned attenuation factor from the identification.

In another preferred embodiment, the present invention is directed to a method for determining an estimated position of mobile wireless client device in a communications environment served by a wireless communications network, the method comprising: identifying a plurality of locations in the communications environment; employing one or more access points to serve the communications environment, wherein each access point is positioned at a location in the plurality of locations; building a model of the communications environment comprising attenuation factors that approximate an attenuation effect on propagation of communications signals in the communications environment between the location of the one or more access points and a second location in the plurality of locations; measuring a received signal strength at the one or more access points of a signal transmitted from a first mobile wireless client device; calculating an error between an expected received signal strength and the received signal strength at each location; and selecting a predicted location representing the estimated position of the first mobile wireless client device based on statistical differences in the error.

DETAILED DESCRIPTION OF THE INVENTION

The object of the invention is to provide a unique and efficient client position estimation methodology which is relatively easy to implement and independent of specialized hardware. The current invention preferably employs IEEE 802.11 compliant hardware, and utilizes the received signal strength indicator (RSSI) determined by the access points. The invention exploits the fact that the strength of the signals that an AP receives from a particular mobile wireless client device will vary with the client device's position.

The invention eliminates the need for a tedious and burdensome data collection phase and also is more practical compared to the highly idealistic techniques employed in prior art methods.

More importantly, the current invention solves the problem of erratic performance of equipment from different vendors due to architectural, design, manufacturing and firmware version variations by normalizing the readings of different vendor devices.

The main advantages of the current invention over the prior methods is ease of use and elimination of hardware or software requirements for the mobile wireless client device or on APs. The current invention utilizes the strengths of the classical prior art methods by bringing out a unique blend of an optional site survey and deployment of an attenuation grid. The current invention uses the RSSI generated by the access points, in contrast to the prior methods where RSSI is measured by the mobile wireless client device.

In more particularity, the signal distribution of APs is collected to train a position determination model. The training phase is followed by the working phase during which the system observes the signals and applies the position determination model to calculate a position. To reduce the complexity of the training phase, a model-based signal propagation training scheme is used in which the signal distribution is trained from a few collected samples. To improve the accuracy of the position system, a "least error" algorithm is introduced in which the position determination relies on both collected signal strength and knowledge of space topology.

In the present invention, preliminary information is obtained about the communications environment. The attenuation factor (N) of the environment is estimated from a preliminary site survey. The attenuation factor of the communications equipment is also considered.

With a view toward an approximate value of 'N' for the communications environment, and an attenuation factor of the communications equipment, radio signal propagation is modeled using an "attenuation grid." This approach is much more practical than prior art methods, as it takes attenuation of the environment into consideration and is less tedious than building a huge database of RSSI at each position on the site.

In the present invention, readings are obtained as the AP receives signals from the mobile wireless client device. In a preferred embodiment, a reasonable degree of accuracy is obtained by taking simultaneous RSSI measurements from several APs. The RSSI calculated by the AP is much more accurate than the RSSI determined by a mobile wireless client device since there are far fewer AP manufacturers and the RSSI can be more easily normalized for this smaller subset of manufacturers. The attenuation factor varies with the device hardware from different vendors.

The present invention considers attenuation factors based on the manufacturer and model of the communications equipment. That is, different attenuation factors are determined based on the manufacturers and equipment model, as manufacturer provided information and real time testing discloses. The current invention comprises normalization of signals from different mobile wireless client vendors. Since RSSI is measured by APs, the subset of AP vendors is much smaller compared to the number of client manufacturers, so differences in RSSI due to vendor variations are more easily eliminated. Further, the prior art methods relied upon specialized hardware components in the mobile wireless client device, which is not required in the present invention.

The present invention comprises a system and method for determining the position of a wireless client device in a wireless network. The system and method are preferably implemented as program code stored and executed by a processor (computer) that is interfaced to wireless access points known in the art. The system preferably determines the position of wireless client devices based on the signal strength of a signal transmitted by the wireless client device and received by one or more access points.

Additionally, the present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, or the like, with the various algorithms being implemented with any combination of data structures, objects, processes, routines or other programming elements. The computer code is preferably programmed in Java.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

System Architecture

Figure 1:
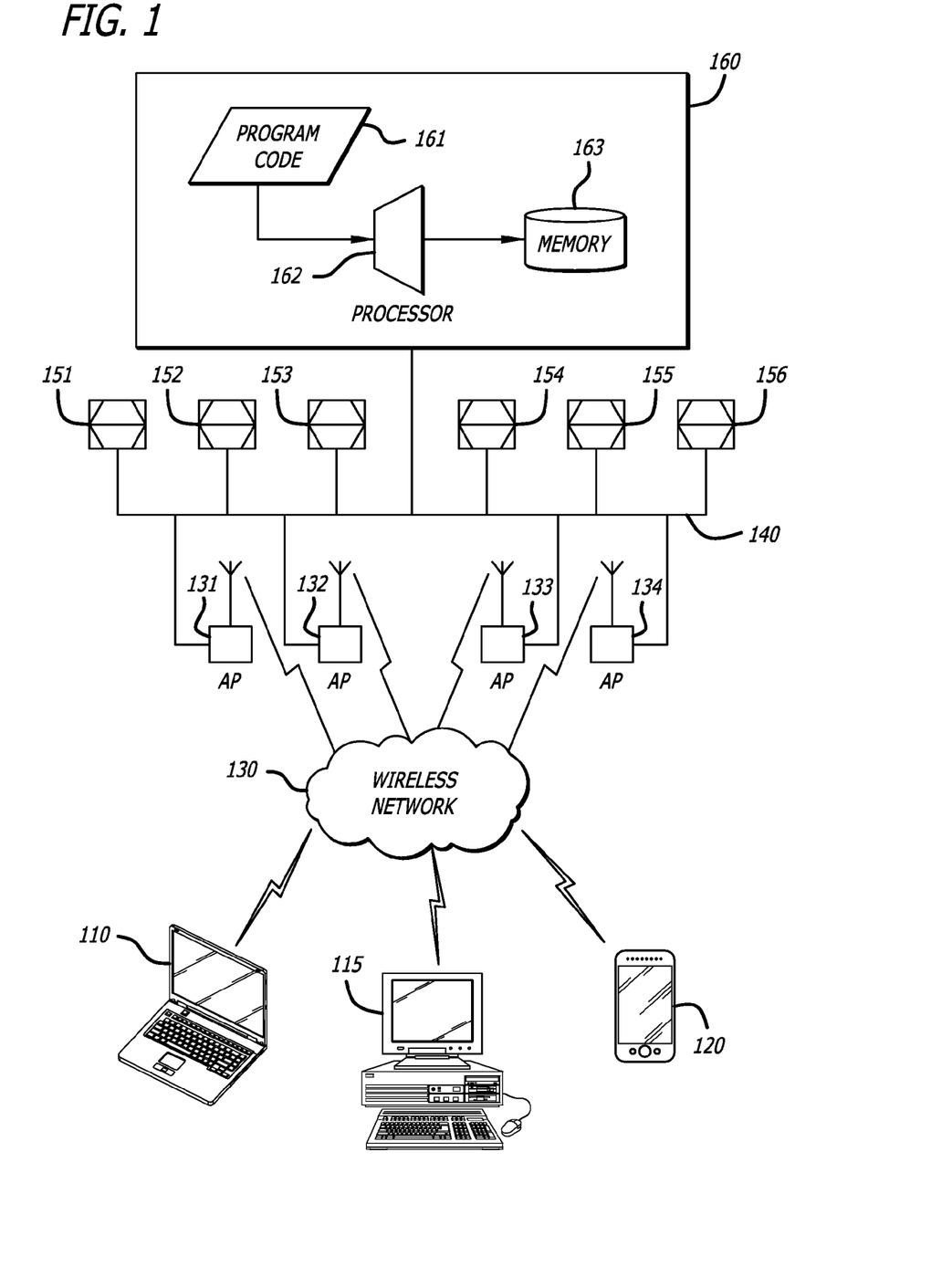
FIG. 1 is a schematic diagram illustrating an exemplary wireless network and a preferred embodiment of a system for determining an estimated position of a wireless client.

FIG. 1 is a schematic diagram illustrating an exemplary wireless network and a preferred embodiment of a system for determining a position of a wireless client. As shown in FIG. 1, a variety of mobile wireless client devices, such as a wireless laptop 110, a wireless workstation 115 or a wireless personal data assistant 120, are served by a wireless network 130 located in a communications environment (not illustrated). The infrastructure for wireless network 130 is provided by one or more access points (APs) 131, 132, 133 or 134, which are coupled to a communications network 140, such as a local area network or the Internet. A variety of computing devices 151, 152, 153, 154, 155, 156 and 160, such as email servers, file servers, Internet gateways, etc., are communicatively coupled to network 140. In combination, networks 130 and 140 and access points 131 to 134, provide communications between mobile wireless client devices 110, 115, 120 and computing devices 151 to 156 and 160.

Computing device 160 comprises program code 161, a processor 162 and a memory 163. Program code 161 comprises software instructions that causes processor 162 to generate a computer program. The computer program, when loaded into memory 163 and executed by processor 162, causes processor 162 to perform a unique, multi-threaded caching algorithm of the inventive system that enables the position of over 100,000 mobile wireless client devices to be determined on the single server processor 162, as described below in connection with FIG. 4. Computing device 160 receives management data from APs 131 to 134, and utilizes the data received to determine the position of mobile wireless client devices 110, 115, 120.

Figure 2:
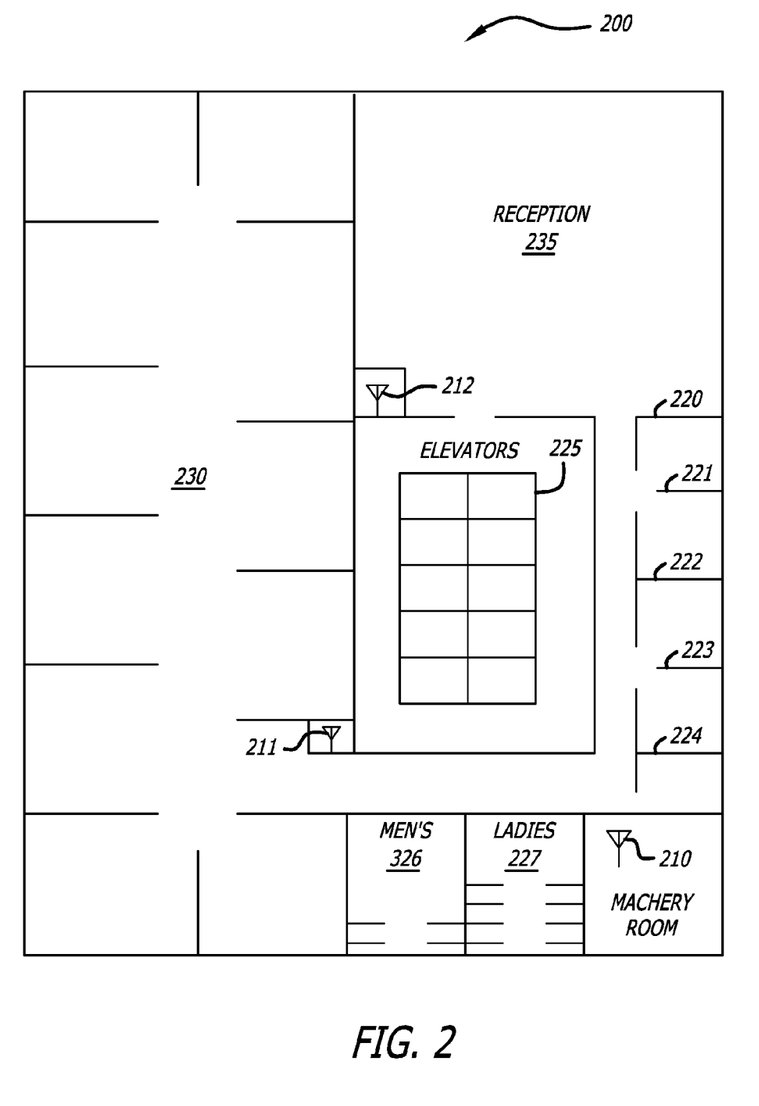
FIG. 2 is a diagram illustrating a floor plan of a physical layout of a communications environment served by a wireless network.

FIG. 2 is a diagram illustrating a floor plan of a physical layout of a communications environment served by a wireless network. As shown in FIG. 2, an office space comprising different areas is drawn on a map. APs 210, 211 and 212, illustrated in FIG. 2, serve the communications environment 200. The communications environment may comprise dense areas, such as offices 220, 221, 222, 223 and 224, elevator bank 225, and lavatories 226 and 227, where dense, communications signal-absorbing materials may be present. The communications environment may also comprise sparse areas, such as cubicle space 230 or reception area 235, where the only obstructions to communications signals might be partitions or office furniture, for example. The communications environment may also comprise outdoor areas (not shown), which have no obstructions.

Figure 3:
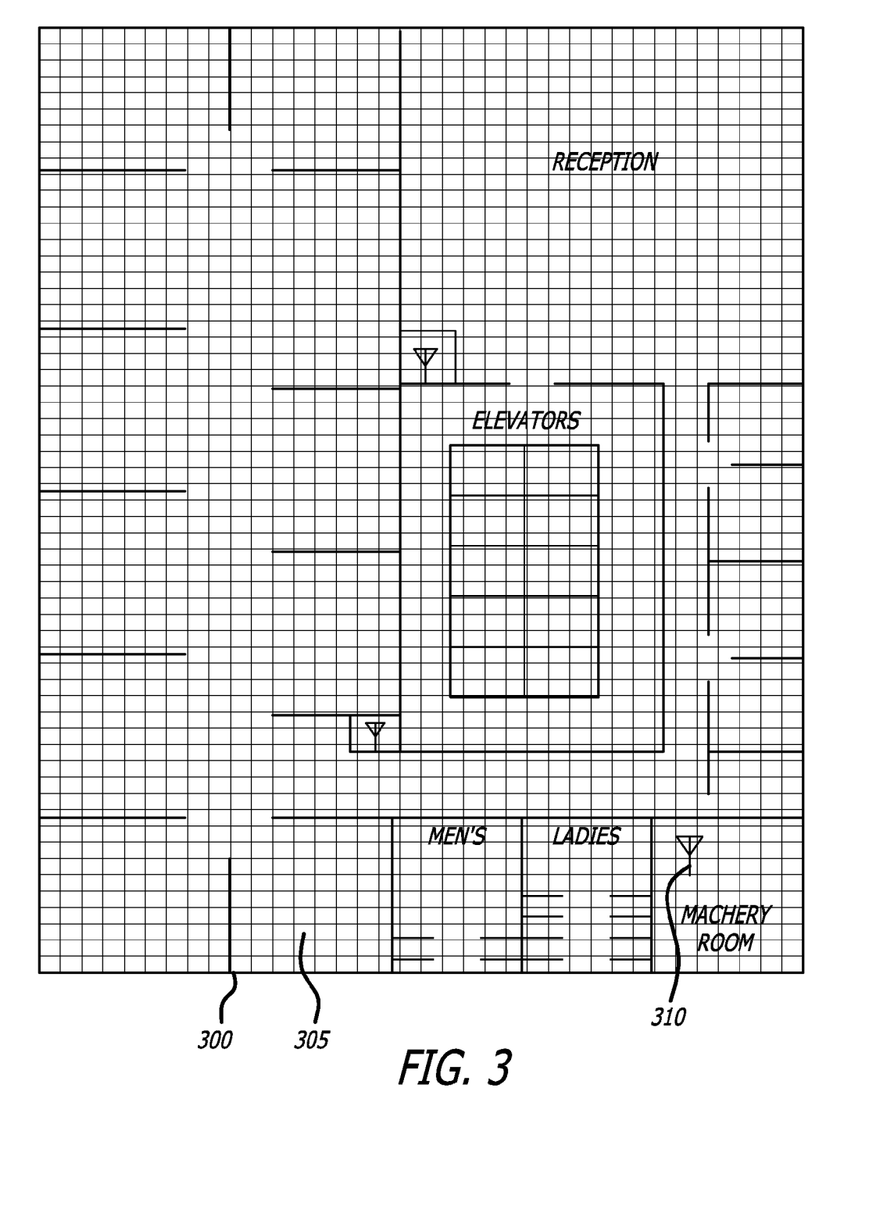
FIG. 3 is a diagram illustrating an attenuation grid comprising a plurality of locations.

FIG. 3 is a diagram illustrating an attenuation grid 300. As shown in FIG. 3, a communications environment site under consideration is partitioned into a grid, preferably comprising equal-sized cells. Since the size of the cell plays a crucial role in the resolution of the position, the cell size should be proportional with the actual dimensions of the communications environment under consideration. A location 305 is preferably designated at the center point of each cell, and is assigned unique coordinates on the attenuation grid. The position of APs are denoted at particular locations. For example, the AP inside the room labeled "machinery room" is located at location 310.

System Operation

Figure 4:
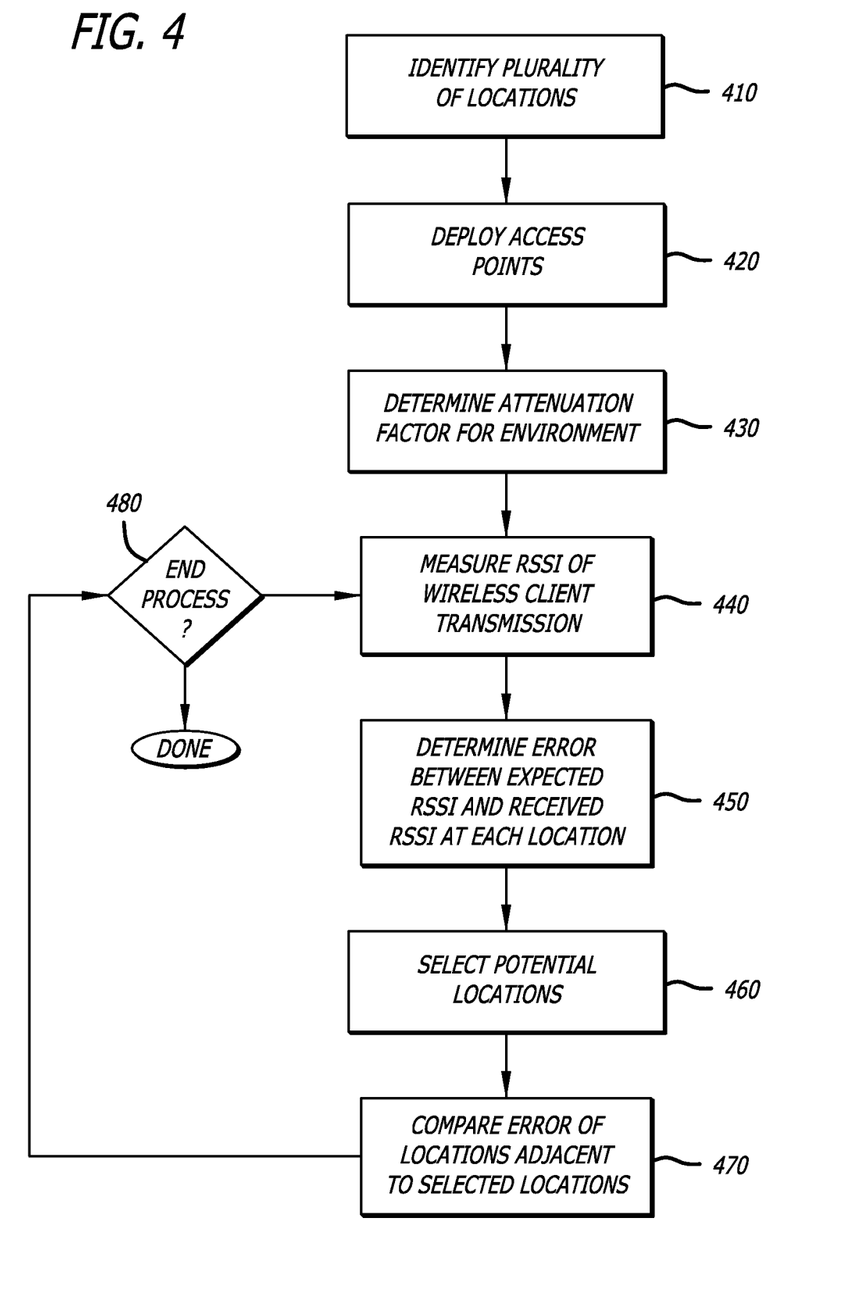
FIG. 4 is a flow chart illustrating a method of determining an estimated position of a wireless client.

FIG. 4 is a flow chart illustrating a method of determining a position of a wireless client. The algorithm depicted in FIG. 4 is preferably implemented in program code 161. In an alternate embodiment, the algorithm may be implemented in hardware which controls system 160, or processor 162 and the associated algorithm may be embedded within a hardware-based server. The following discussion describes the methods performed by the inventive system. To provide context, the operation of an exemplary, preferred embodiment of program code 161 is described. Preferably, unique multi-thread caching algorithm is employed that enables calculations of over 100,000 client positions on a single server.

With reference to FIG. 4, in step 410, a plurality of locations are identified on an attenuation grid. Preferably, these points are the aforementioned center points of the cells in the aforementioned attenuation grid. Alternatively, the locations may be designated throughout the communications environment. In a preferred embodiment, a floor plan image (generally a CAD file) is imported into the system, and based on the dimensions of the drawing, a grid overlay is sized to the floor plan. For example, a 2×2 sized cell for a 100×200 floor plan will result in 5,000 grid cells, and therefore 5,000 locations.

In step 420, access points (APs) are deployed throughout the communications environment, to ensure proper communications coverage, as is well-known in the art. The APs are preferably positioned at locations in the attenuation grid.

In step 430, the attenuation factor for the environment is determined. In a preferred embodiment, an overall attenuation factor for the floor plan is determined based on the general characteristics of the communications environment, (i.e., indoor dense, indoor cubicle, outdoor free space). Next, the path loss from every AP to every location on the floor plan is calculated. In a preferred embodiment, structural features and obstructions (such as walls, enclosed stairwells, etc.) are placed on the floor plan and assigned an attenuation loss based on its ability to absorb the communications signal. For example, a particular building material will have a known effect on the absorption of the signal. Then, the path loss from every AP to every location is recalculated using the updated attenuation information.

In yet a further preferred embodiment, characteristics of each AP are used to assign a further attenuation factor, based on the AP's receive-sensitivity, antenna beam width, orientation, and elevation, etc.

In step 440, the RSSI of each mobile wireless client device is measured by APs that are within communications range of the mobile wireless client device. As such measurements are taken, the path loss from every signal received is recalculated based on real-time attenuation information obtained by such reception measurements. In a preferred embodiment data concerning each mobile wireless client device is used to identify characteristics of the transmitted signal, such as the transmitted signal strength. Transmitted signal strength varies based on the type of client device. The system automatically determines strength based on the media access control (MAC) layer address. The IEEE assigns an Organizational Unique Identifier (OUI) to manufacturers of network interface cards. Each network interface card has a unique MAC address, which comprises six bytes. The first three bytes of the MAC address are the OUI. In a preferred embodiment, the present invention allows a user to dynamically tune the data based on site surveys. In a preferred embodiment, the inventive system has over 11,000 OUI blocks which can assign transmission power to any mobile wireless client device.

In addition, a preferred embodiment of the present invention applies 3 signal weighting metrics for each signal received from a mobile wireless client device. In an exemplary embodiment, the RSSI levels are −32 to −70 dBm (highest weighted) −71 to −79 dBm (middle weight), and −80 to −85 (least weighted). RSSI signals measuring less than −85 dBm are ignored.

In step 450, the inventive system performs computations for each and every single cell in the grid, with respect to all the APs that receive communications signals from the mobile wireless client device. At each cell in the grid, the error is determined from the difference between the received signal strength and a predicted signal strength is compared and an aggregate of all the errors for each cell is taken into consideration.

In step 460, a plurality of potential locations are selected for the position of the mobile wireless client device. In a preferred embodiment, the grid cell having the least error is considered to be the most apt cell where the mobile wireless client device is located.

In an alternative embodiment, illustrated in step 470, if there is more than a single grid cell having the same minimum error value, adjacent grid cells surrounding the selected potential locations are selected, and the least statistical error is taken into consideration and compared to determine the most likely position of the mobile wireless client device. In other words, the group of cells having the least error are considered to be the most accurately determined position for the mobile wireless client device.

In step 480, the inventive process may be repeated indefinitely, or may end subject to, for example, user intervention.

Figure 5:
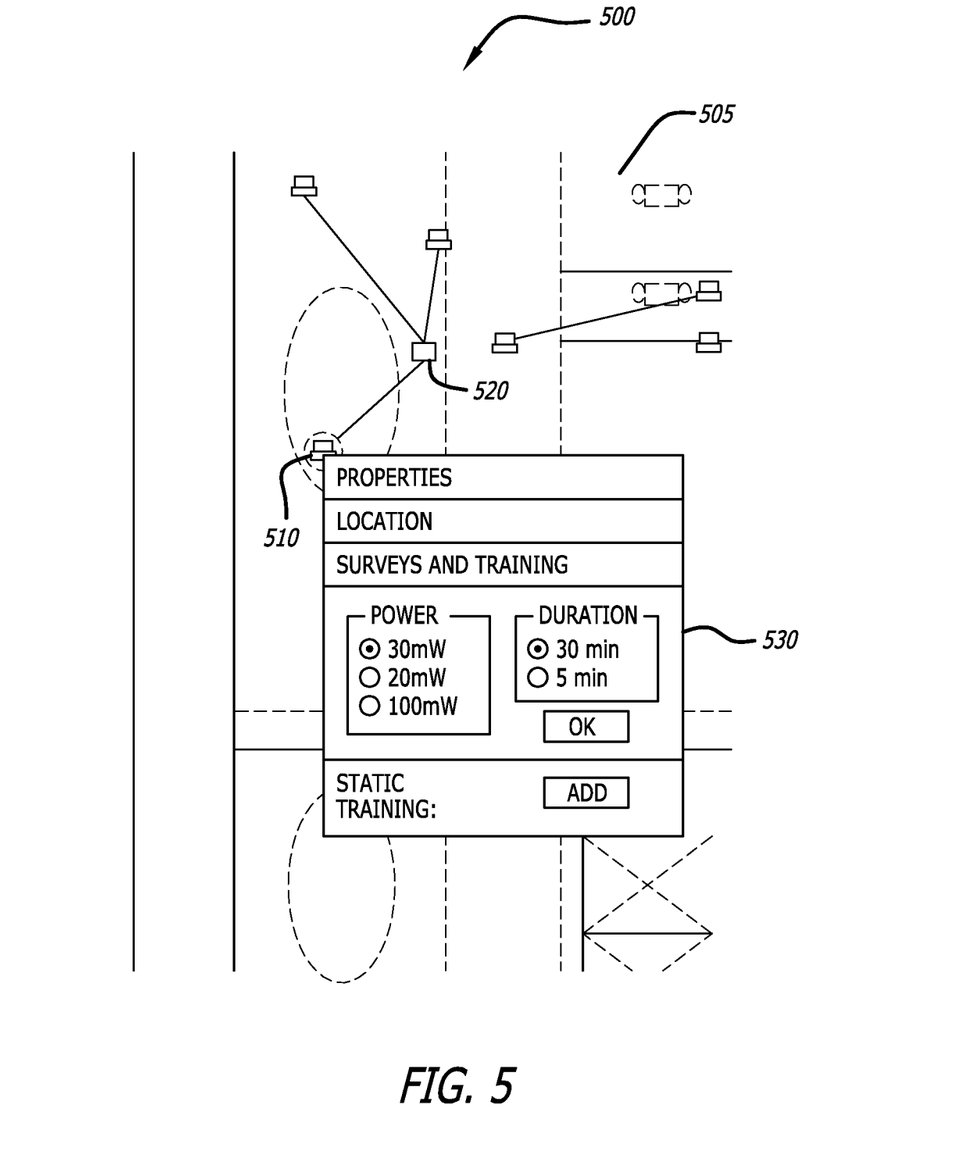
FIG. 5 is a screen diagram illustrating identification of a known position of a wireless client on a floor plan.

FIG. 5 is a screen diagram illustrating identification of a known position of a wireless client on a floor plan. To further enhance position accuracy, a user of the position monitoring system can perform a self-initiated remote site-survey, by dragging an icon representing their mobile wireless client device to its current position on the floorplan and recording the signal strength that the APs received the device's signal. As readings from such site-surveys are performed, the system may recalculate the path loss from every AP to every grid cell based on the remote client survey data. As illustrated in FIG. 5, a mobile wireless client device 510 is selected, dragged to its current position on floor plan 505, and identified as supplying a signal received by an AP 520. A dialog box 530 provides the ability to enter parameters concerning mobile wireless client device 510, such as the transmitted power level and the duration of a survey. In a preferred embodiment, the mobile wireless client device can be statically measured, i.e., such that the readings do not modify the attenuation grid information, to further enhance the accuracy and reduce the processing consumption of the method.

Software on Media

Figure 6:
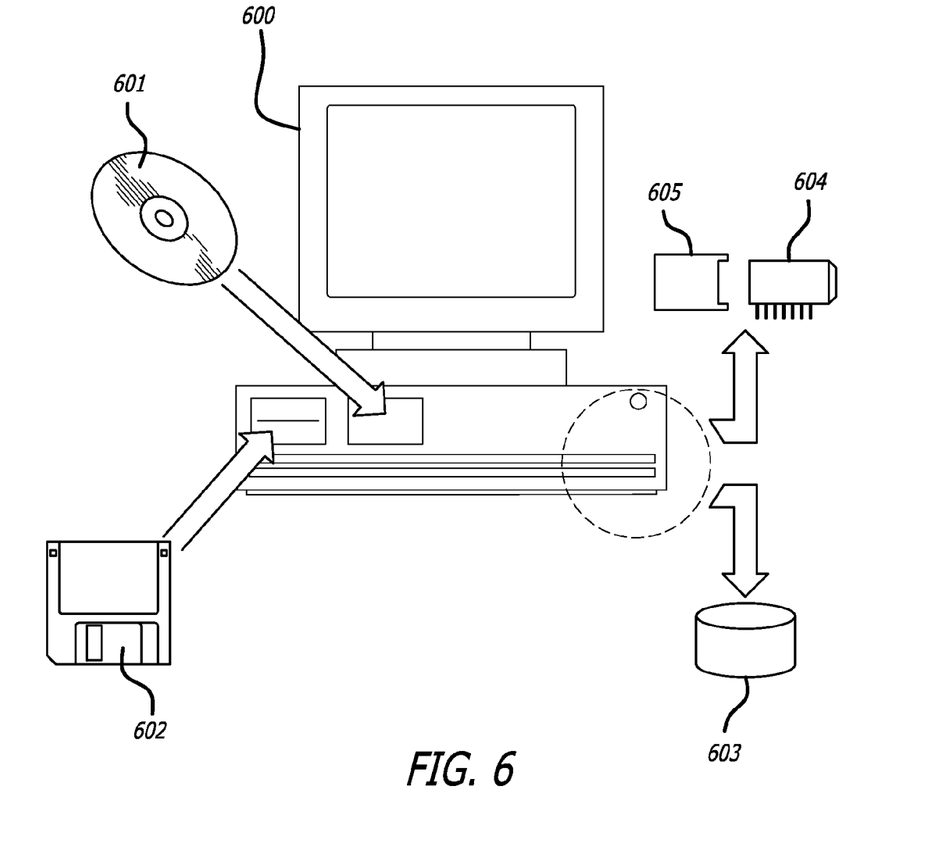
FIG. 6 illustrates examples of recording media.

In the specification, the term "media" means any medium that can record data therein. FIG. 6 illustrates examples of recording media.

The term "media" includes, for instance, a disk shaped media for 601 such as CD-ROM (compact disc-read only memory), magneto optical disc or MO, digital video disc-read only memory or DVD-ROM, digital video disc-random access memory or DVD-RAM, a floppy disc 602, a memory chip 604 such as random access memory or RAM, read only memory or ROM, erasable programmable read only memory or E-PROM, electrical erasable programmable read only memory or EE-PROM, a rewriteable card-type read only memory 605 such as a smart card, a magnetic tape, a hard disc 603, and any other suitable means for storing a program therein.

A recording media storing a program for accomplishing the above mentioned apparatus may be accomplished by programming functions of the above mentioned apparatuses with a programming language readable by a computer 600 or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer processing device 600, any suitable device for performing computations in accordance with a computer program may be used. Examples of such devices include a personal computer, a laptop computer, a microprocessor, a programmable logic device, or an application specific integrated circuit.

Having thus described at least illustrative embodiments of the invention, various modifications and improvements will readily occur to those skilled in the art and are intended to be within the scope of the invention. For example, the methods and structure presented can be applied to any wireless communications system, including infrared or radio frequency communications. Accordingly, the foregoing description is by way of example only and is not intended as limiting. The invention is limited only as defined in the following claims and the equivalents thereto.

What is claimed is:

1. A method comprising:
   identifying a plurality of locations in a communications environment having a plurality of structural features;
   assigning an attenuation loss factor to each of the plurality of structural features according to an ability by the structural feature to absorb communications signals;
   determining a plurality of locations at which a plurality of access points are deployed throughout the communications environment by:

determining, for each of the plurality of access points, an estimated signal strength of a wireless signal originating at a location among the plurality of locations;

normalizing the estimated signal strength based on an attenuation factor determined from a manufacturer and a model of the particular access point, and antenna characteristics of the particular access point; and determining for each of the plurality of access points, a path loss of the wireless signal communicated from the location among the plurality of locations, based upon:

the assigned attenuation loss factors of the structural features positioned between the particular access point and the location among the plurality of locations; and the determined estimated signal strength of the particular access point.

2. The method of claim 1, further comprising:

using the determined path losses for each of the plurality of access points to determine a distance between a wireless device and the particular access point of the plurality of access points.

3. The method of claim 1, further comprising:

receiving a signal from the wireless device;

determining a signal strength of the received signal; and estimating a position of the wireless device within the plurality of locations based upon a comparison between the received signal strength and the determined estimated signal strength at the location among the plurality of locations for the particular access point.

4. The method of claim 3, wherein estimating the position of the wireless device within the plurality of locations further comprises calculating an error between the received signal strength and each of the determined estimated signal strengths and estimating the position of the wireless device to be the location among the plurality of locations resulting in the least error.

5. The method of claim 1, wherein determining the estimated signal strength further comprises determining the estimated signal strength for each of the plurality of access points at the plurality of locations using the determined attenuation factor for the particular access point.

6. A computing device comprising:

a processor; and a memory on which is stored machine readable instructions that are to cause the processor to:

identify a plurality of locations in a communications environment having a plurality of structural features;

assign an attenuation loss factor to each of the plurality of structural features according to an ability by the structural feature to absorb communications signals;

determine locations at which a plurality of access points are deployed throughout the communications environment, wherein the machine readable instructions are further to cause the processor to:

determine an estimated signal strength of a wireless signal originating at a location among the plurality of locations;

normalize the estimated signal strength based on an attenuation factor determined from a manufacturer and a model of the particular access point and antenna characteristics of the particular access point; and determine for each of the plurality of access points, a path loss of the wireless signal communicated from the location among the plurality of locations, based upon:

the assigned attenuation loss factors of the structural features positioned between the particular access point and the location among the plurality of locations; and the determined estimated signal strength of the particular access point.

7. The computing device of claim 6, wherein the machine readable instructions are further to cause the processor to:

use the determined path losses for each of the plurality of access points to determine a distance between a wireless device and the particular access point of the plurality of access points.

8. The computing device of claim 6, wherein the machine readable instructions are further to cause the processor to:

receive a signal from the wireless device;

determine a signal strength of the received signal; and estimate a position of the wireless device within the plurality of locations based upon a comparison between the received signal strength and the determined estimated signal strength at the location among the plurality of locations for the particular access point.

9. The computing device of claim 8, wherein to estimate the position of the wireless device within the plurality of locations, the machine readable instructions are further to cause the processor to:

calculate an error between the received signal strength and each of the determined estimated signal strengths and estimate the position of the wireless device to be the location among the plurality of locations resulting in the least error.

10. The computing device of claim 6, wherein the machine readable instructions are further to cause the processor to determine the estimated signal strength for each of the plurality of access points at the plurality of locations using the determined attenuation factor for the particular access point.

11. A non-transitory computer readable medium comprising instructions that, when executed by a processor, cause the processor to:

identify a plurality of locations in a communications environment having a plurality of structural features;

assign an attenuation loss factor to each of the plurality of structural features according to an ability by the structural feature to absorb communications signals;

determine locations at which a plurality of access points are deployed throughout the communications environment, wherein the instructions are further to cause the processor to:

determine an estimated signal strength of a wireless signal originating at a location among the plurality of locations;

normalize the estimated signal strength based on an attenuation factor determined from a manufacturer and a model of the particular access point and antenna characteristics of the particular access point; and determine for each of the plurality of access points, a path loss of the wireless signal communicated from the location among the plurality of locations, based upon:

the assigned attenuation loss factors of the structural features positioned between the particular access point and the location among the plurality of locations; and the determined estimated signal strength of the particular access point.

12. The non-transitory computer readable medium of claim 11, wherein the instructions are further to cause the processor to:

use the determined path losses for each of the plurality of access points to determine a distance between a wireless device and the particular access point of the plurality of access points.

13. The non-transitory computer readable medium of claim 11, wherein the instructions are further to cause the processor to:

receive a signal from the wireless device;

determine a signal strength of the received signal; and estimate a position of the wireless device within the plurality of locations based upon a comparison between the received signal strength and the determined estimated signal strength at the location among the plurality of locations for the particular access point.

14. The non-transitory computer readable medium of claim 13, wherein to estimate the position of the wireless device within the plurality of locations, the instructions are further to cause the processor to:

calculate an error between the received signal strength and each of the determined estimated signal strengths and estimate the position of the wireless device to be the location among the plurality of locations resulting in the least error.

15. The non-transitory computer readable medium of claim 11, wherein the instructions are further to cause the processor to determine the estimated signal strength for each of the plurality of access points at the plurality of locations using the determined attenuation factor for the particular access point.

* * * * *